United States Patent
Finlow-Bates

(10) Patent No.: US 10,862,959 B2
(45) Date of Patent: Dec. 8, 2020

(54) CONSENSUS SYSTEM AND METHOD FOR ADDING DATA TO A BLOCKCHAIN

(71) Applicant: Keir Finlow-Bates, Kangasala (FI)

(72) Inventor: Keir Finlow-Bates, Kangasala (FI)

(*) Notice: Subject to any disclaimer, the term of this patent is extended or adjusted under 35 U.S.C. 154(b) by 987 days.

(21) Appl. No.: 15/362,345

(22) Filed: Nov. 28, 2016

(65) Prior Publication Data
US 2017/0075941 A1   Mar. 16, 2017

(51) Int. Cl.
  *H04L 29/08*  (2006.01)
  *H04L 9/32*  (2006.01)

(52) U.S. Cl.
  CPC .......... *H04L 67/104* (2013.01); *H04L 9/3239* (2013.01); *H04L 2209/38* (2013.01); *H04L 2209/56* (2013.01)

(58) Field of Classification Search
  None
  See application file for complete search history.

(56) References Cited

U.S. PATENT DOCUMENTS

| 4,309,569 | A | 1/1982 | Merkle |
| 9,608,829 | B2 | 3/2017 | Spanos et al. |
| 10,262,164 | B2* | 4/2019 | Rodriguez De Castro ................ G09C 1/00 |
| 2016/0261690 | A1* | 9/2016 | Ford .................. H04L 67/1044 |
| 2017/0046526 | A1* | 2/2017 | Chan .................. G06Q 20/0655 |
| 2017/0046792 | A1* | 2/2017 | Haldenby .......... G06Q 20/0655 |
| 2017/0046799 | A1* | 2/2017 | Chan .................. G06Q 20/0655 |
| 2017/0352012 | A1* | 12/2017 | Hearn .................. G06Q 20/065 |
| 2018/0005186 | A1* | 1/2018 | Hunn .................... G06F 17/211 |
| 2018/0084042 | A1* | 3/2018 | Finlow-Bates ....... H04W 12/04 |
| 2018/0115425 | A1* | 4/2018 | Dechu .................. H04L 9/3239 |

(Continued)

FOREIGN PATENT DOCUMENTS

WO    2016046821 A1    3/2016

OTHER PUBLICATIONS

Bitfury Group, Proof of Stake versus Proof of Work, 2015, retrieved from http://bitfury.com/content/5-white-papers-research/pos-vs-pow-1.0.2.pdf—fig 1 and section 1.1 in particular.

(Continued)

*Primary Examiner* — Mark D Featherstone
*Assistant Examiner* — Navneet Gmahl

(57) ABSTRACT

A method and apparatus is presented for reaching consensus on adding data to a distributed ledger system in which no central trusted authority is available, comprising sending an announcement message by a network connected device to a plurality of network connected devices over a peer-to-peer network, said message providing an identification of the network connected device using a public key of a public/private key pair, a unique address identifier, and a hash. Subsequently, after a waiting period measured in, for example, time or blocks of data, the network connected device may submit data for inclusion in the distributed ledger. If the announcement message and preceding data in the distributed ledger satisfy a predetermined condition, the plurality of network connected devices may include the data in the distributed ledger. If the network connected device fails to submit the data when the predetermined condition is satisfied, the announcement message may be canceled.

16 Claims, 7 Drawing Sheets

(56) References Cited

U.S. PATENT DOCUMENTS

2019/0272393 A1\* 9/2019 Rodriguez De Castro .................. H04L 63/1458

OTHER PUBLICATIONS

Poelstra, A., On Stake and Consensus, 2015, retrieved from https://download.wpsoftware.net/bitcoin/pos.pdf—particularly chapter 4.

\* cited by examiner

CONSENSUS SYSTEM AND METHOD FOR ADDING DATA TO A BLOCKCHAIN

TECHNICAL FIELD

The invention relates to computer systems and methods concerned with the addition of data to a distributed ledger or blockchain, and more specifically to the establishing of a consensus amongst participants as to which data should be added via the medium of a peer-to-peer network on which the distributed ledger or blockchain is shared.

BACKGROUND OF THE INVENTION

Distributed ledgers provided in peer-to-peer networks, such as the blockchain used in the Bitcoin cryptocurrency system, rely on a consensus system agreed-upon by the participants on the peer-to-peer network in order to add blocks of data to the ledger. In such systems, participants examine proposed data block additions in order to verify that they conform to a network agreed standard, rather than relying on a third-party trusted central authority to authorize the addition of the data A consensus system should ideally be objective, that is, any newcomer to the blockchain system should be able to independently determine from the blocks available which sequence of blocks forms an actual core blockchain without requiring external guidance.

It should also be deterministic, that is, two entities with the same set of blocks should, through application of the consensus system, produce the same chain and come to the same conclusion as to which block constitutes the end of the chain.

The consensus system should be resistant to alteration, in that it should be prohibitively expensive to attempt to create and extend a fork containing differing data diverging from the main blockchain from a point earlier in the chain.

Finally, when applied in a collaborative environment the consensus system should have a low computational overhead to reduce energy consumption and hardware requirements.

A problem in systems such as Bitcoin is that the consensus system used, called "proof-of-work", is an inefficient energy-consuming solution that has initiated a dedicated hashing hardware arms-race.

A further common consensus system, called "proof-of-stake" relies on subjective and non-deterministic consensus, in that multiple chains of blockchain data may be equally valid, and therefore there is no objective means to choose between them.

Another consensus system, called "proof-of-elapsed-time" requires dedicated trusted execution environment hardware, which is not present in most computer systems such as smartphones, laptops, point-of-sales terminals and other ubiquitous computing equipment.

Another consensus system, called "practical Byzantine fault tolerance" is implemented through multiple rounds of participant voting, requiring messages in the network to be signed multiple times. This introduces a computational overhead to calculate the signatures and a disk space overhead to store all the multiple signatures generated.

As it stands, running a validator node, or "miner" in blockchain terminology, in order to maintain and extend a blockchain, requires significant levels of some or all of: computational power, memory, energy, disk space, and dedicated hardware. As a result it is unfeasible for Internet-of-Things devices, smart phones, point of sales terminals, and other lower-powered yet ubiquitous computer equipment to participate in blockchain maintenance.

Mining on blockchains using current consensus systems is therefore generally the preserve of large server farms in cheap-energy locations, and both the trustworthiness of the blockchain and the global environment have suffered accordingly.

It is the intention of the present invention to address the shortcomings of the prior art, that is, the problem of reliably and objectively reaching consensus in an energy efficient manner on a blockchain without requiring dedicated hardware, powerful computing equipment or significant amounts of memory and disk space.

SUMMARY OF THE INVENTION

In accordance with the present invention, a solution is provided for reaching a consensus among peer devices on a peer-to-peer network maintaining and extending a distributed ledger, as to what data to add to the distributed ledger over time. The problem is a need for a consensus system that is low in energy consumption, does not require dedicated hardware or powerful computing equipment, or significant amounts of memory and disk space, and yet is objective, deterministic and tamper-proof.

Miners, comprising, in a preferred embodiment of the present invention, network connected devices participating in maintaining and extending the distributed ledger, may receive data and messages over the peer-to-peer network, which they may package into data blocks for potential inclusion in the distributed ledger.

In an embodiment of the present invention, a network connected device that wishes to participate as a miner may first announce itself on the network with an announcement message. Subsequently, the network connected device may wait for a predetermined period of time to pass or an agreed number of data blocks to be added to the distributed ledger. Finally, the network connected device may participate by submitting a data block when a predetermined condition is met, based on a property of an accepted data block, a value computed from the announcement message, and a computation, calculation, mathematical function, formula or operation performed on the value and the property. If said predetermined condition is met, but the network connected device fails to submit the data block, then the announcement message for the network connected device may be canceled.

In one embodiment of the invention, a plurality of network connected devices, each comprising one or more processors, and storage media comprising computer instructions, said plurality of network connected devices being connectible via a peer-to peer network to each other, are arranged such that when computer instructions are executed on the one or more processors of a one or more of the plurality of network connected devices, operations are caused for reaching a consensus for adding a block of data to a distributed ledger.

In this embodiment, operations commence by a first of the plurality of network connected devices generating an announcement message that may indicate said first of the plurality of network connected devices' intent to become a miner for the blockchain or distributed ledger, comprising a public key of a public/private key pair, a unique address identifier, and a hash of the public key and the unique address identifier.

In one embodiment of the invention, the unique address identifier may comprise a network address.

In other embodiments of the invention, the unique address identifier may comprise one or more of: an email address, a MAC address, a domain name, a passport number, a social security number, a bank account number, a credit card number, an identification number.

The first of the plurality of network connected devices may then transmit the announcement message, through the use of the peer-to-peer network, to the plurality of network connected devices connected to the peer-to-peer network.

Subsequently the announcement message may be inserted into an initial block of data by a one of the plurality of network connected devices and submitted to the peer-to-peer network for inclusion in the distributed ledger.

Finally the plurality of network connected devices may validate the block of data to determine if it may be added to the distributed ledger, and if the block of data is successfully validated using a predetermined condition, it may be appended to or inserted into the distributed ledger.

Through these means, the first of the plurality of network connected devices may be added to a list of devices permitted to submit data blocks for inclusion in the distributed ledger.

In further embodiment of the invention, the first of the plurality of network connected devices may then wait a predetermined time before it may validly submit data blocks for inclusion in the distributed ledger.

In an alternative embodiment of the invention, the first of the plurality of network connected devices may then wait for a predetermined number of blocks to be added to the distributed ledger by other network connected devices before it may validly submit data blocks for inclusion.

In another embodiment of the invention, the announcement message may signed by the first of the plurality of network connected devices using a private key of the public/private key pair.

After the announcement message is included in the distributed ledger, and the predetermined waiting period, measured in time or in blocks of data added to the distributed ledger, has been reached, the first of the plurality of network connected devices may begin submitting data blocks for inclusion in the distributed ledger. The data blocks may be accepted by a remainder of the plurality of network connected devices and included in the distributed ledger if a predetermined condition is met. Possible embodiments of the predetermined condition are explained below.

In a preferred embodiment of the invention, for each block to be added or appended to the distributed ledger, the plurality of network connected devices may initially calculate a value based on a hash output generated from a previous block of data in the distributed ledger.

In other embodiments of the invention, the value may be calculated from an input of a plurality of blocks of data extracted from the distributed ledger using: a root of a Merkle tree, a root of a Patricia tree, a root of a radix tree, or a hash output from a set of prior ledger data.

Subsequently the plurality of network connected devices may calculate a set of differences between the value, and a set of hashes of public keys and unique address identifiers extracted from each announcement message stored in the distributed ledger.

The plurality of network connected devices may then determine a primary candidate for submitting a next data block for adding or appending to the distributed ledger, using a selection criterion that may comprise selecting a miner whose announcement message produces one of: a smallest difference, a largest difference, a difference closest to a target value, a difference closest to the target value modulo a constant, a difference calculated using a function taking as its input the value of the hash output and the value of the hash of the public key and the unique address identifier.

Similarly, the plurality of network connected devices may determine a secondary candidate, a tertiary candidate, and so on, by applying the same criterion in order to sort to the set of differences in order to construct a list of candidates.

The primary candidate may then have a limited time in which to submit the next data block for adding or appending to the distributed ledger, to the peer-to-peer network. If said next data block is submitted, a remainder of the plurality of network connected devices may then append it to or insert it into the distributed ledger.

In one embodiment of the invention, if the primary candidate does not submit the next block of data for inclusion in the distributed ledger, then the announcement message for the primary candidate may be canceled. The secondary candidate may then have an opportunity to submit the next block of data. Similarly, if the secondary candidate does not submit the next block of data, the tertiary candidate may then have the same opportunity, and so on down the list of candidates.

Those skilled in the art will further appreciate the advantages and superior features of the invention together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles of the present invention. In the figures, like reference numerals designate corresponding parts throughout the different views.

DETAILED DESCRIPTION OF THE INVENTION

Figure 1:
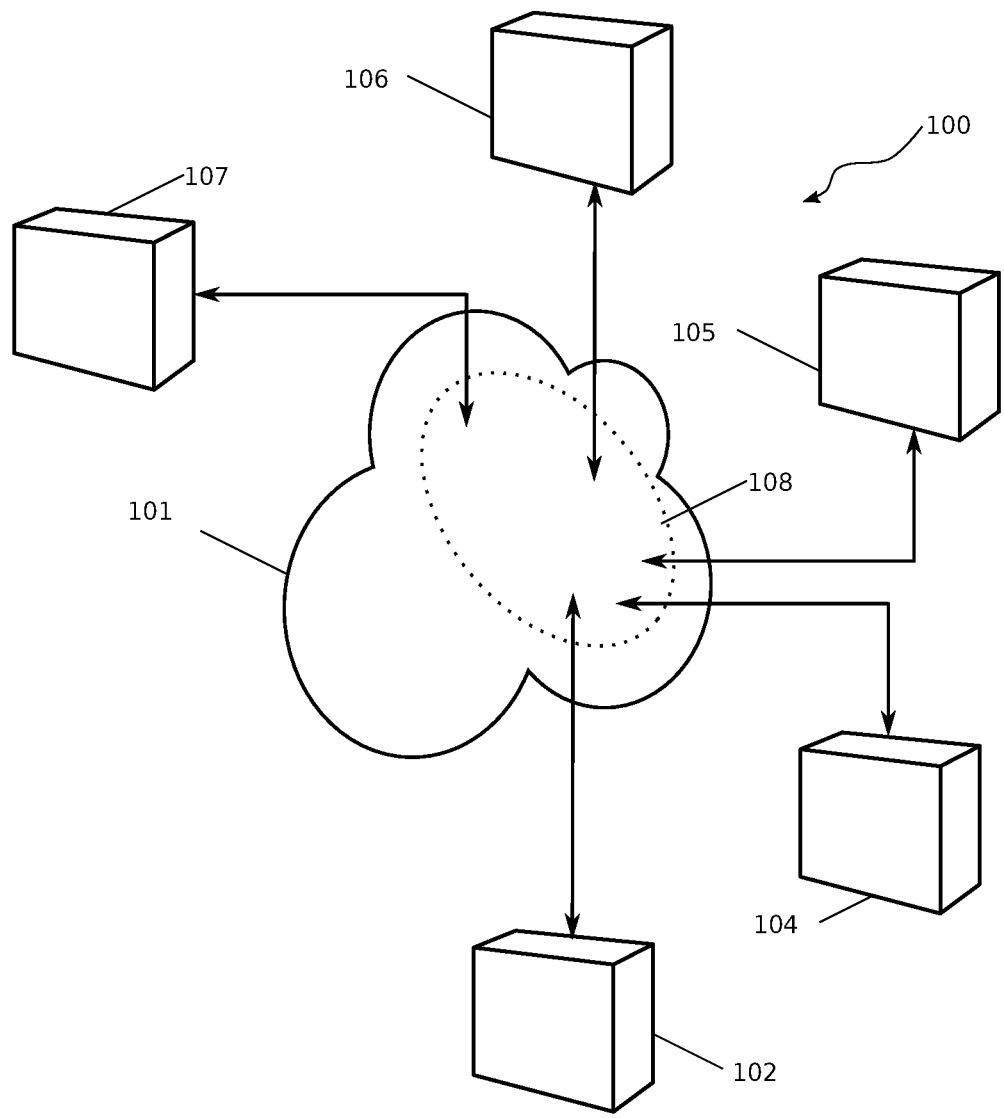
FIG. 1 illustrates a peer-to-peer network with a plurality of network connected devices connected to the peer-to-peer network, in accordance with an embodiment of the present invention.

Aspects of this disclosure will be described in the context of an exemplary system of a plurality network connected devices communicating through the medium of a peer-to-peer network system 100, as shown schematically in FIG. 1.

As depicted, the peer-to-peer network 108 is embodied within a packet switched network 101, through the interconnection of the plurality of network connected devices on the peer-to-peer network 108.

A network connected device 102 may connect to the peer-to-peer network through a direct connection to the packet switched network with a wired connection, or through a wireless connection by association with a wireless access point, a cellular base station, a Bluetooth connection, or other means of connection.

Other devices connected the peer-to-peer network may include network connected devices acting as a "standard node" 104, 105 whose role is to maintain a list of other devices connected through the peer-to-peer network, and to forward on received network messages to those devices on the list, possibly independently, or possibly as a response to a request from another network connected device. As one skilled in the art will be aware, no individual standard node is required to have a complete list of all devices, as the process of peer-to-peer networking only requires that a union of a set of all standard nodes contains a complete list of all devices on the peer-to-peer network, and for every pair of network connected devices there is a network route from one device to the other, possibly via a set of one or more nodes. Therefore, the only requirement to be a participant on the peer-to-peer network is to establish a connection to one or more of the standard nodes on said network.

Further devices connected via the peer-to-peer network may include one or more network connected devices 106, 107 acting as a validator node, whose role may be to act as a standard node, and may also be to receive miner announcement messages and other transaction messages from the peer-to-peer network, process them according to the methods and processes to be described further below, and transmitting the results of said processing back to the peer-to-peer network for inclusion in a distributed ledger.

The devices described above may each be implemented through a system comprising a one or a plurality of: general purpose microprocessors, digital signal processors (DSPs), application specific instruction set processors (ASIPs), field programmable gate arrays (FPGAs), dedicated application specific integrated chips (ASICs), or other equivalent integrated or discrete logic circuitry and peripheral circuitry, connected to a tangible storage medium containing instructions which when executed effect methods and techniques described below. The techniques additionally, or alternatively, may be realized at least in part by a computer-readable communication medium or record carrier, that carries or communicates code in the form of instructions or data structures and that can be accessed, read, and/or executed by a computer.

Figure 2:
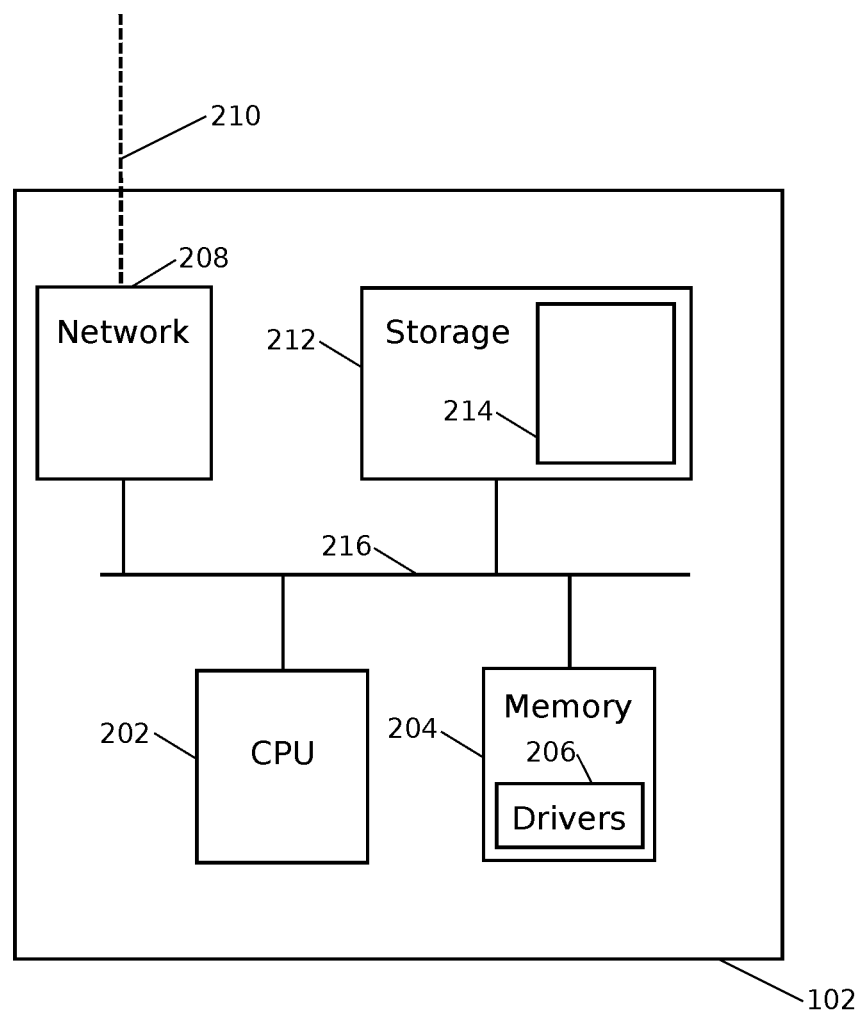
FIG. 2 illustrates a network connected device that may be utilized in the generation of a miner announcement message, in accordance with an embodiment of the present invention.

An embodiment of the network connected device 102 is presented in FIG. 2, and is now discussed in further detail. The network connected device 102 may comprise a CPU 202 capable of executing instructions stored in a memory 204, and controlling other peripheral components through drivers 206 stored within the memory 204.

Further storage 212 may be present, which may contain a cryptographically secure partition or component 214, where cryptographic keys may be securely stored.

The network connected device 102 may connect to the packet switched network through a network module 208, which may consist of a direct wired connection to the packet switched network through a cable 210. In a different embodiment of the invention, the network module 208 may contain wireless components comprising one or more wireless modules implemented in firmware or hardware, including a wireless local area network (WLAN) unit such as a Wi-Fi adapter utilizing an 802.11 protocol, a wireless wide area network (WWAN) unit such as GSM, LTE, or other cellular wireless data communication system, or a Bluetooth unit. The wireless components may provide network connectivity to a packet switched network and hence to the peer-to-peer network for the network connected device.

Components comprising the network connected device may communicate through a bus 216, which may be implemented as a peripheral component interconnect express (PCIe) bus, a universal serial bus (USB), a universal asynchronous receiver/transmitter (UART) serial bus, a suitable advanced micro-controller bus architecture (AMBA) interface, a serial digital input output (SDIO) bus, or other equivalent interface.

Figure 3:
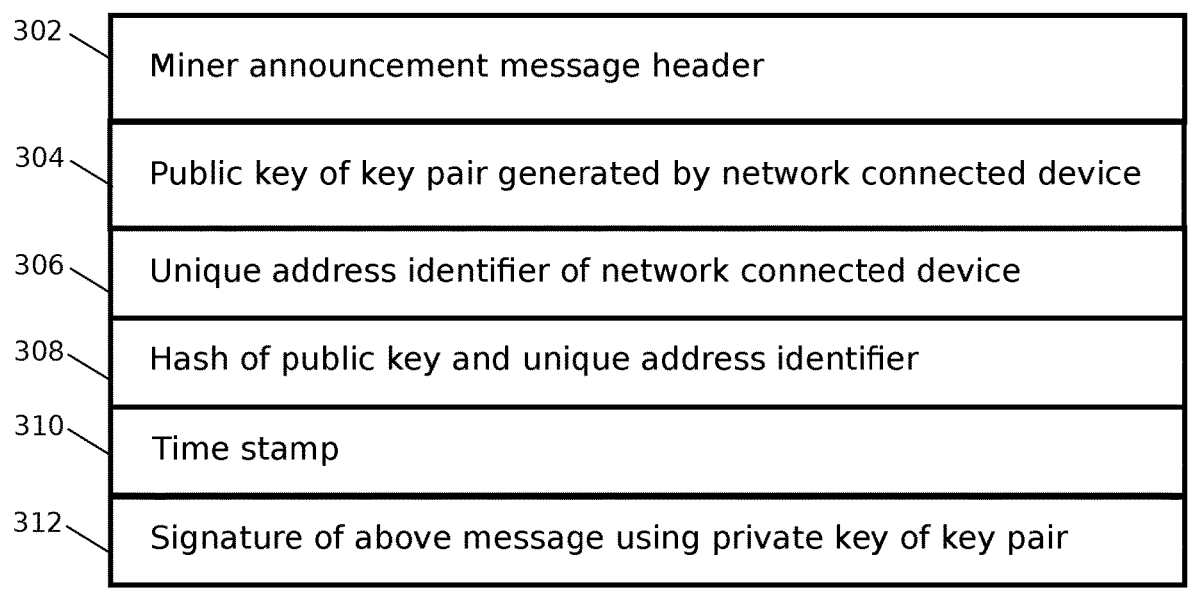
FIG. 3 is a block diagram illustrating a structure of a possible embodiment of a miner announcement message, in accordance with an embodiment of the present invention.

FIG. 3 presents a possible embodiment of a miner announcement message. The miner announcement message header 302 may comprise a marker indicating that the rest of the message contains miner announcement data, and other header information such as the length of the message and a version number of the message.

The miner announcement message may comprise a public key 304 of a public/private key pair generated by the miner to be announced. The public key infrastructure or algorithm may be one of ECDSA, DSA, RSA, ElGamal, or some other secure asymmetric cryptographic key system.

The miner announcement message may comprise a unique address identifier 306 for the network connected device submitting the miner announcement message. The unique address identifier may be one or more of: a network address, an email address, a MAC address, a domain name, a passport number, a social security number, a bank account number, a credit card number, an identification number, or any other number or identifier that is uniquely linked to the network connected device.

The miner announcement message may also comprise a hash 308 of the public key 304 and the unique address identifier 306 in the preceding message content. The hash may be one of a SHA, RIPEMD, Whirlpool, Scrypt, HAS-160, BLAKE, or other cryptographic hash function applied to all or part of the preceding content of the message, where a hash output cannot be determined from a hash input other than by the application of the cryptographic hash function to the hash input. The hash 308 may be referred to as a Miner Identification Number (MIN).

The miner announcement message may contain a time stamp 310, which in one embodiment of the invention may be used to indicate from what point in time the miner announcement is valid. Through these means it may be possible to register a miner on the network with a future mining validity period, for example by specifying the time stamp as a future time. In another embodiment the time stamp may be a current time, thereby initiating authorizing the miner at the point the miner announcement is sent, or at a fixed predetermined time after the miner announcement is set.

The miner announcement message may also comprise a digital signature 312, generated using the private key of the public/private key pair associated with the public key 304 and a hash of a some or all of a preceding data of the miner announcement message, in order to provide for a veracity or an authentication of the miner announcement message. The digital signature algorithm used may be one of ECDSA, DSA, RSA, ElGamal, or some other secure asymmetric key digital signing algorithm.

In an alternate embodiment of the invention, the miner announcement message may comprise the hash of the some or all of the preceding message, and the digital signature 312, generated using a second private key of a second public/private key pair, for example a public key of an agency or a device providing permission to use the distributed ledger or blockchain.

Figure 4:
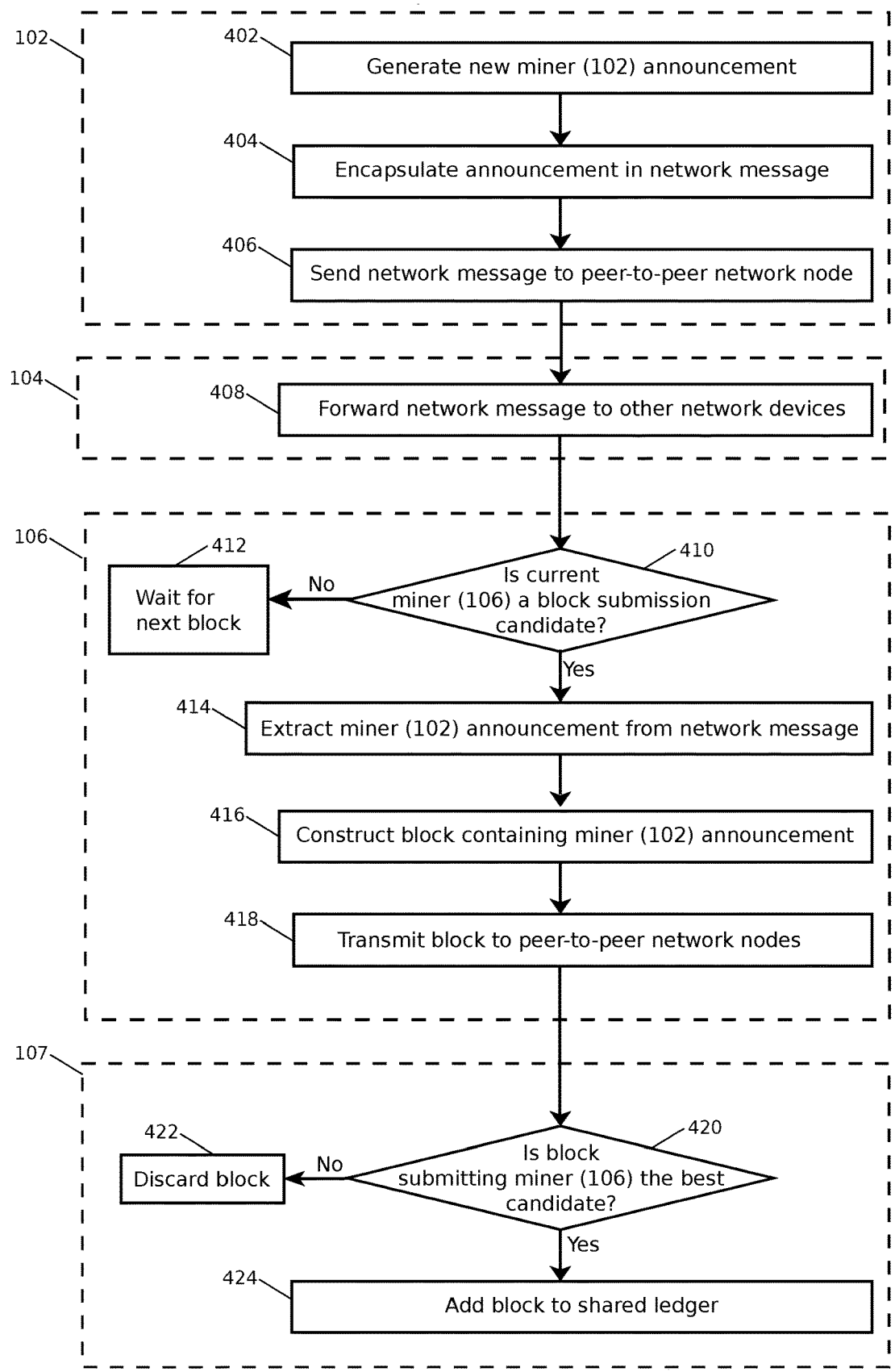
FIG. 4 is a signal flow diagram providing a general overview of a method and apparatus controlling the flow of the miner announcement message data from the first of the plurality network connected device to the plurality of network connected devices connected via the peer-to-peer network for eventual inclusion in a distributed ledger.

A high level flow diagram illustrating one possible embodiment of the system and steps taken therein is presented in FIG. 4. Note that although the embodiment and example provided by FIG. 4 is for the generation and inclusion of a miner announcement message in the distributed ledger, the same flow diagram and associated methods and processes apply to a generation and inclusion of multiple miner announcement messages. From here on "a miner announcement message" can be equally read as "multiple miner announcement messages". Note further that an other data may also be generated and included following the same methods taught in the following paragraphs describing the function and implementation of the system and method illustrated by FIG. 4.

The interaction of the network connected device 102 with the plurality of network connected devices, and specifically a network connected device functioning as a standard node 104, and a network connected device functioning as a validator node 106, and finally another one of the plurality of network connected devices 107 functioning as a validator node, is shown. The flow of a data comprising the generation of the miner announcement message, inclusion in a successfully generated block of data, and an insertion or appending of said block of data to the distributed ledger is also illustrated through FIG. 4.

Once the network connected device 102 has determined a need to announce itself on the distributed ledger or blockchain as a miner, it may generate the miner announcement message 402. The miner announcement message may then be encapsulated in a network message 404 and sent on to the peer-to-peer network 406.

Once the miner announcement message encapsulated in the network message has been received by a network connected device acting as a standard node 104, the node may forward the message to other network connected devices on the peer-to-peer network 408. Other network connected devices may also make requests to the standard node for network messages that they have not yet received. Through these means, the miner announcement message encapsulated in the network message is forwarded to all interested parties on the peer-to-peer network.

Through these network interactions, the miner announcement message encapsulated in the network message may arrive at a network connected device acting as a validator node 106. The validator node 106 may then determine whether it is a candidate for submitting a block of data to the distributed ledger 410. Further details teaching how the validator node may determine its suitability are provided below in paragraphs explaining the functions of FIG. 5 and FIG. 6. For now it suffices to say that the method described may allow the validator node 106 to decide with certainty whether it is a suitable candidate.

If the validator node 106 determines that it is not the suitable candidate for generating and submitting a block of data to the distributed network at the current time, then it may store the network message, and wait for the generation and submission of a next block by another validator node determined to be a next suitable candidate, as per step 412.

If the validator node 106 determines that it is the suitable candidate for generating and submitting the block of data to the distributed network at the current time, and optionally if the miner announcement message encapsulated in the network message has not been included in a prior block of data, the validator node 106 may proceed to step 414, and extract the miner announcement message from the network message.

After the miner announcement message has been obtained, the validator node 106 may construct a block of data containing the miner announcement message, and any other messages that the validator node has previously received and that have not yet been included in the distributed ledger, as noted in step 416. The block of data may also contain other messages and elements, for example but not limited to, other miner announcement messages, financial transaction data, key announcement and/or key revocation data, and other data to be stored in the distributed ledger.

The validator node 106 may then transmit the block of data containing the miner announcement message to the peer-to-peer network as per step 418.

Through transmission to the peer-to-peer network, the block of data may arrive at an another network connected device 107, which may constitute an another validator node, or an another standard node. The another network connected device 107 may then repeat the same computation as previously performed by the validator node 106 in step 410, and the computation may return either a successful result or a failure 420. If the computation result is a failure, the another network connected device 107 may determine the validator node 106 to not be a suitable candidate, and may discard the block, as shown in step 422. If the computation produces a successful result, then the another network connected device 107 may determine the validator node 106 to be a suitable candidate, and may add the block of data to a copy of the distributed ledger 424.

Figure 5:
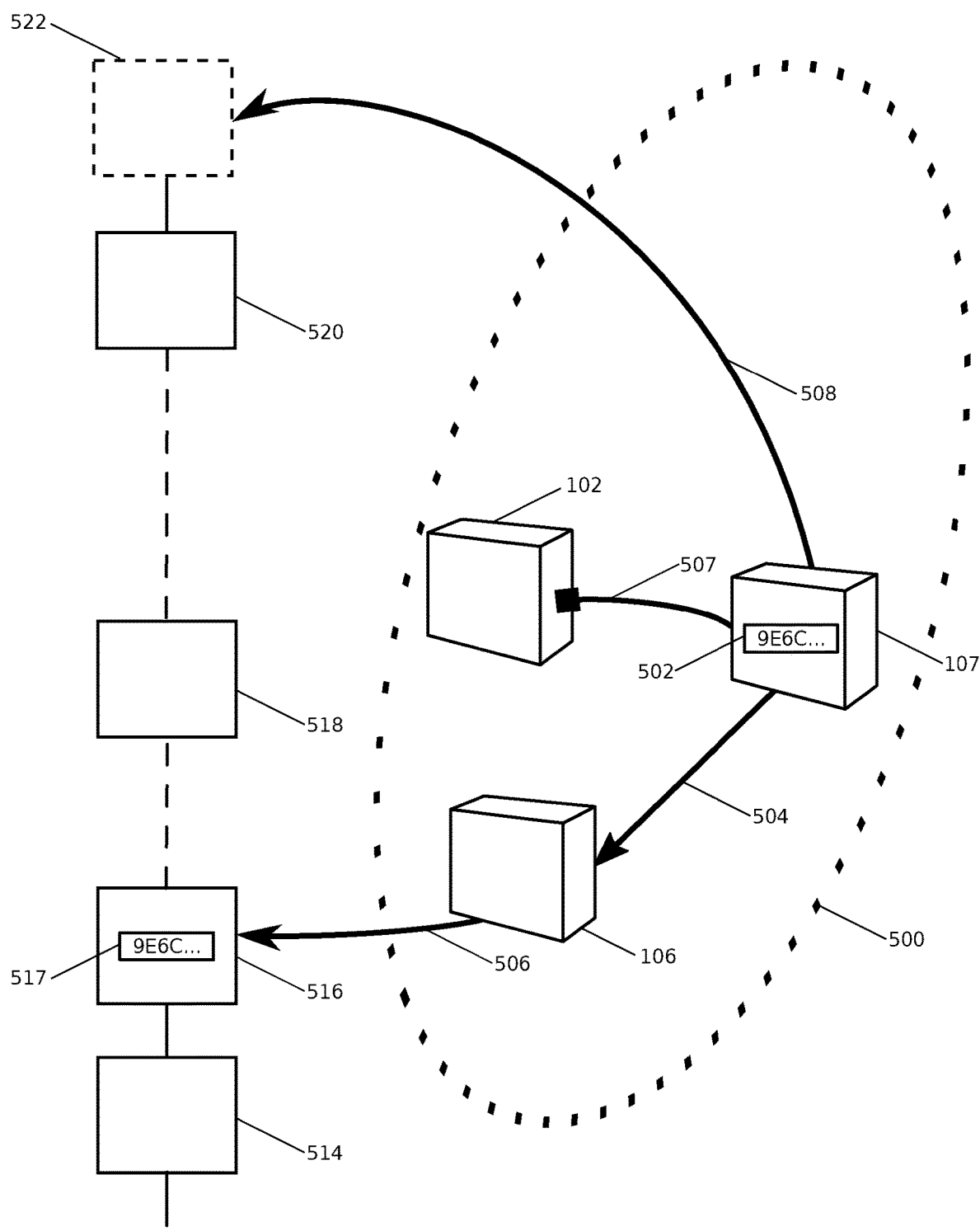
FIG. 5 is a diagram presenting a possible embodiment of the invention demonstrating a waiting period for the miner submitting the miner announcement message after it is included in the distributed ledger, before the miner announcement message becomes valid and the miner may therefore submit a data block.

FIG. 5 illustrates how the plurality of network connected devices comprising a set of validator nodes may determine whether the network connected device submitting the miner announcement message may contribute to the addition of a data block to the distributed ledger at a given time or a given state of the distributed ledger.

The area within a dotted ellipse 500 may indicate the set of validator nodes, which may comprise the plurality of network connected devices, either embodied in hardware, or as virtual machines running within an other computer hardware.

The area outside of the dotted ellipse 500 may indicate a state of the distributed ledger, as represented within a memory and/or a disk storage of the plurality of network connected devices.

The network connected device 107 may generate a miner announcement message containing the hash of the public key and the unique address identifier 502, which henceforth is referred to as a Miner Identification Number (MIN).

Arrow 504 indicates the network connected device 107 submitting the miner announcement message containing the miner identification number 502 to the peer-to-peer network, where it may be incorporated in a miner announcement data block by the validator node 106.

Arrow 506 indicates the validator node 106 successfully submitting the miner announcing data block comprising a copy of the MIN 517 for inclusion in the distributed ledger as represented by a block 516 at either a time T1 or a block height B1.

Those skilled in the art will appreciate that the block height B1 indicates that there are a total of (B1−1) blocks that precede a block 516. For example, a block 514 that precedes the block 516 would have a block height (B1−1).

Subsequently, the plurality of network connected devices may append a further blocks of data to the distributed ledger.

In an embodiment of the invention, the plurality of network connected devices may subscribe to an agreed condition under which newly announced miners may not successfully submit a block of data for inclusion in the distributed ledger until a predetermined period of time T has passed.

Under the agreed condition, the network connected device 107 may issue a block of data submitted at a time T2, where T2−T1<T, and the block of data submitted at time T2 may be rejected by the plurality of network connected devices. This is illustrated by a line 507, terminated with a square. The validator node 102 may receive the block of data submitted at time T2, and may refuse to add it to the distributed ledger. As a result, a block 518 may be successfully submitted by a different network connected device.

In another preferred embodiment of the invention the plurality of network connected devices may subscribe to a second agreed condition under which newly announced miners may not successfully submit a block of data for inclusion in the distributed ledger until a predetermined number of blocks B have been added to the distributed ledger.

Under the second agreed condition, the network connected device 107 may issue a block of data submitted at a block height B2, where B2−B1<B, and the block of data submitted at height B2 may be rejected by the plurality of network connected devices. This is illustrated by a line 507, terminated with a square. The validator node 102 may receive the block of data submitted at the block height B2, and may refuse to add it to the distributed ledger. As a result, a block 518 at the block height B2 may be submitted successfully by the different network connected device.

Under the agreed condition, the network connected device 107 may issue a block of data submitted at a time T3, where T3−T1>T, and the block of data submitted at time T3 may be accepted by the plurality of network connected devices. This is illustrated by an arrow 508. As a result, a block 522 may be generated by the network connected device 107, accepted by the plurality of network connected devices, and inserted or appended to the distributed ledger.

Under the second agreed condition, the network connected device 107 may issue a block of data submitted at a block height B3, where B3−B1>B, and the block of data submitted at height B3 may be accepted by the plurality of network connected devices. This is illustrated by the arrow 508. In this scenario, a preceding block 520 may have a block height of (B3−1). As a result, a block 522, corresponding to the block height B3, may be generated by the network connected device 107, and may be accepted by the plurality of network connected devices, and inserted or appended to the distributed ledger.

Figure 6:
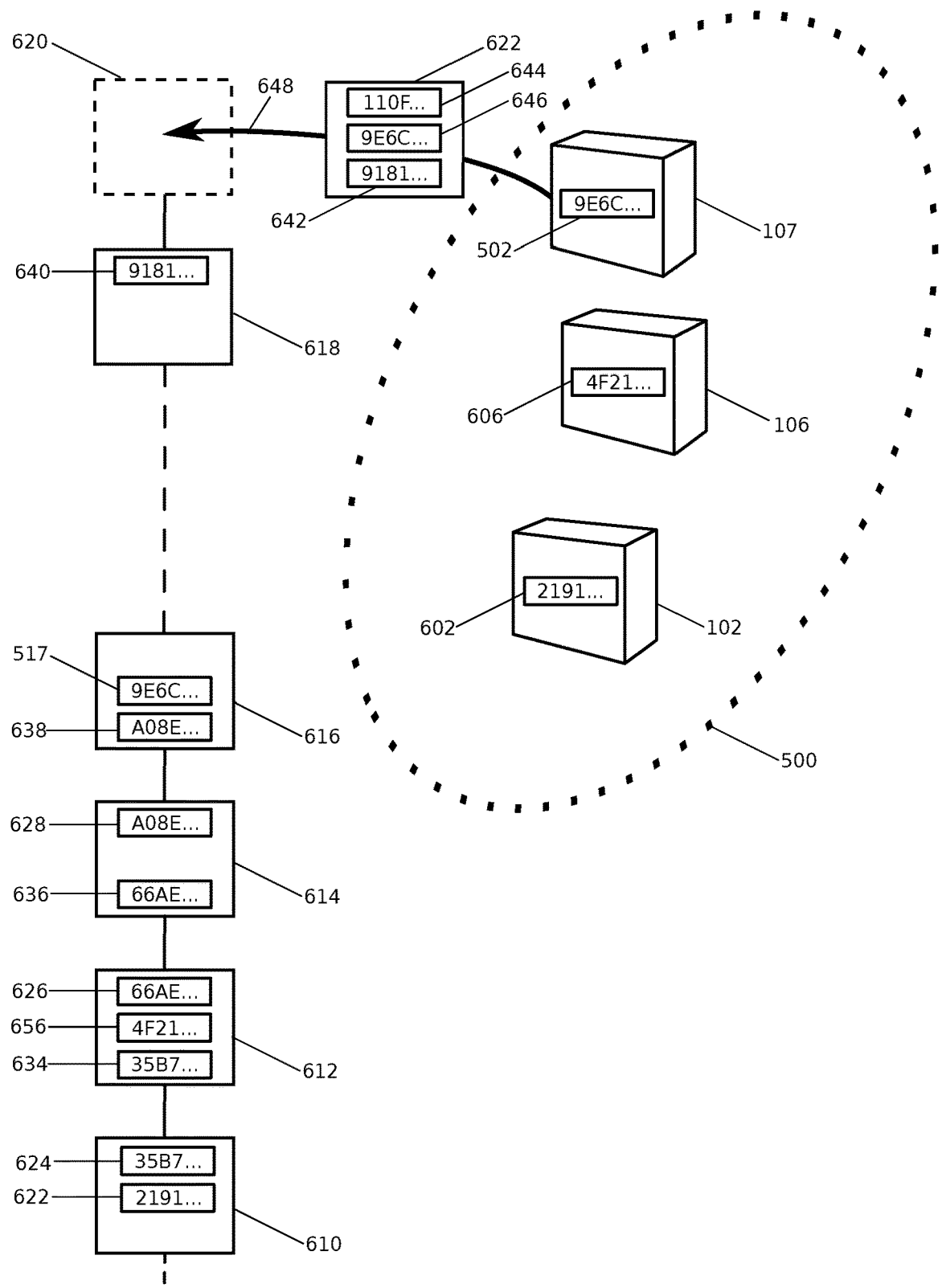
FIG. 6 is a diagram showing a participation of three network connected devices acting as miners, or validator nodes, in order to determine a next block of data that may be add to the distributed ledger, in accordance with an embodiment of the present invention.

FIG. 6 illustrates how a set of validator nodes may determine which node among them is selected to add the next block of data to the distributed ledger at any given time or state of the distributed ledger. Although a specific example with given validator nodes, hash values and Miner Identification Numbers (MINs) is presented, the example below is intended to teach through a concrete implementation how the system and method may be instantiated. Through this example those skilled in the art may reach a clearer understanding of the general principles and components that comprise a variety of embodiments of the present invention.

Once again the area within the dotted ellipse 500 may indicate the set of validator nodes, which may comprise the plurality of network connected devices, either embodied in hardware, or as virtual machines running within computer hardware.

The area outside of the dotted ellipse 500 may indicate the state of the distributed ledger, as represented within a memory and/or a disk storage of the plurality of network connected devices.

Within the dotted ellipse 500 are three validator nodes 102, 106 and 107, comprising a consensus building set of validators for the distributed ledger in an embodiment of the invention.

The validator node 102 may have generated a miner identification number 602, for example beginning with hexadecimal digits 2191, and reported on the distributed ledger in a miner announcement message 622, encapsulated in a ledger block 610. A hash of a data contained within ledger block 610, denoted in FIG. 6 with the label 624, may begin with hexadecimal digits 35B7.

The validator node 106 may have generated a miner identification number 606, for example beginning with hexadecimal digits 4F21, and reported on the distributed ledger in a miner announcement message 656, encapsulated in a ledger block 612. A hash of a data contained within ledger block 612, denoted in FIG. 6 with the label 626, may begin with hexadecimal digits 66AE. Furthermore, the data contained within ledger block 612 may contain an equivalent hash value 634 equal in value to a preceding block hash value, the hash with the label 624, linking ledger block 612 back to ledger block 610.

A subsequent ledger block 614 may, in this exemplary case of an embodiment of the invention, contain no miner announcement messages. A hash of a data 628, encapsulated within the subsequent ledger block 614, may begin with the hexadecimal digits A08E. A data encapsulated with the subsequent ledger block 614 may contain a hash 636 equal to the hash of the data denoted in FIG. 6 with the label 626, thereby linking ledger block 614 back to ledger block 612. Those skilled in the art will appreciate that through these mechanisms, in this embodiment of the invention, blocks within the ledger form a linked list, with each block linked to a preceding block by inclusion of a hash of a preceding block in a subsequent block.

In other embodiments of the invention, each block may be linked to the preceding block by inclusion of a hash root of one or more of, but not limited to: a Merkle tree, a Patricia tree, a radix tree, or some other function taking as its input one or more of a preceding blocks.

A further subsequent ledger block 616 may contain a miner announcement message 517 for the validator node 107, with a Miner Identification Number 502, or MIN, starting with hexadecimal digits 9E6C. The further subsequent ledger block 616 may be linked back to the subsequent ledger block 614 that precedes it by inclusion of a value 638 in the further subsequent ledger block 616 with an equivalent value to the hash of the data 628 encapsulated in the subsequent ledger block 614, thereby extending the linked list.

An example for an embodiment of the present invention has now been outlined, and a reaching of a consensus for adding blocks to the distributed ledger may now be presented. After a number of data blocks have been added to the distributed ledger, without loss of generality, an exemplary block 618, may reside at a tip of the distributed ledger, with an exemplary hash 640 of a data within the exemplary block 618, starting with hexadecimal digits 9181. A consensus may now be reached as to which validator node may submit a next block.

In one embodiment of the invention, illustrated by FIG. 6, the validator node with a MIN closest in value to the exemplary hash 640, may be selected to submit the next block. In this example, that would be validator node 107, with a MIN 502 beginning with hexadecimal digits 9E6C. As the other validator nodes have MINs that are further from the exemplary hash 640, starting as they do with hexadecimal digits 2191 and 4F21, a block submitted by validator node 107 to succeed block 618 may be accepted in preference to other submissions by the plurality of network connected devices comprising the peer-to-peer network maintaining and extending the distributed ledger.

Validator node 107 may then proceed to construct a new data block 622, comprising a back-link value 642 equal to the exemplary hash 640, a copy of the MIN 646, and a hash of a data comprising the new data block 644.

The new data block 622 may then be submitted to the peer-to-peer network, as indicated by arrow 648, and may occupy a next space in the distributed ledger 620.

In another embodiment of the invention, the validator node chosen as a prime candidate to submit the new data block may be selected on a basis of the validator node with the MIN that is furthest from the exemplary hash 640, for example where the difference between the validator node MIN and the exemplary hash is largest.

In another embodiment of the invention, the validator node chosen as a prime candidate to submit the new data block may be selected on a basis of the validator node with the MIN that is closest to a predetermined target value, for example where the difference between the predetermined target value and the validator MIN is smallest.

In another embodiment of the invention, the validator node chosen as a prime candidate to submit the new data block may be selected on a basis of the validator node with the MIN that, when provided as an input to a predetermined function, produces a value that is closest to a predetermined target value, for example where the difference between the predetermined target value and the validator MIN is one of: a smallest, a largest, a closest to a target value.

A situation may arise in which the prime candidate to submit the new data block fails to submit said new data block within a predetermined time. As a result, the system may come to a consensus to select a secondary candidate, a tertiary candidate, and so on, to ensure that the new data block may definitely be submitted within a predetermined time limit, through the method and apparatus detailed in FIG. 7.

In FIG. 7, again, the area within the dotted ellipse 500 indicates the set of validator nodes, which may comprise a plurality of network connected devices, either embodied in hardware, or as virtual machines running within computer hardware.

The area outside of the dotted ellipse 500 indicates a state of the distributed ledger, as represented within a memory and/or a disk storage of the plurality of network connected devices.

Figure 7:
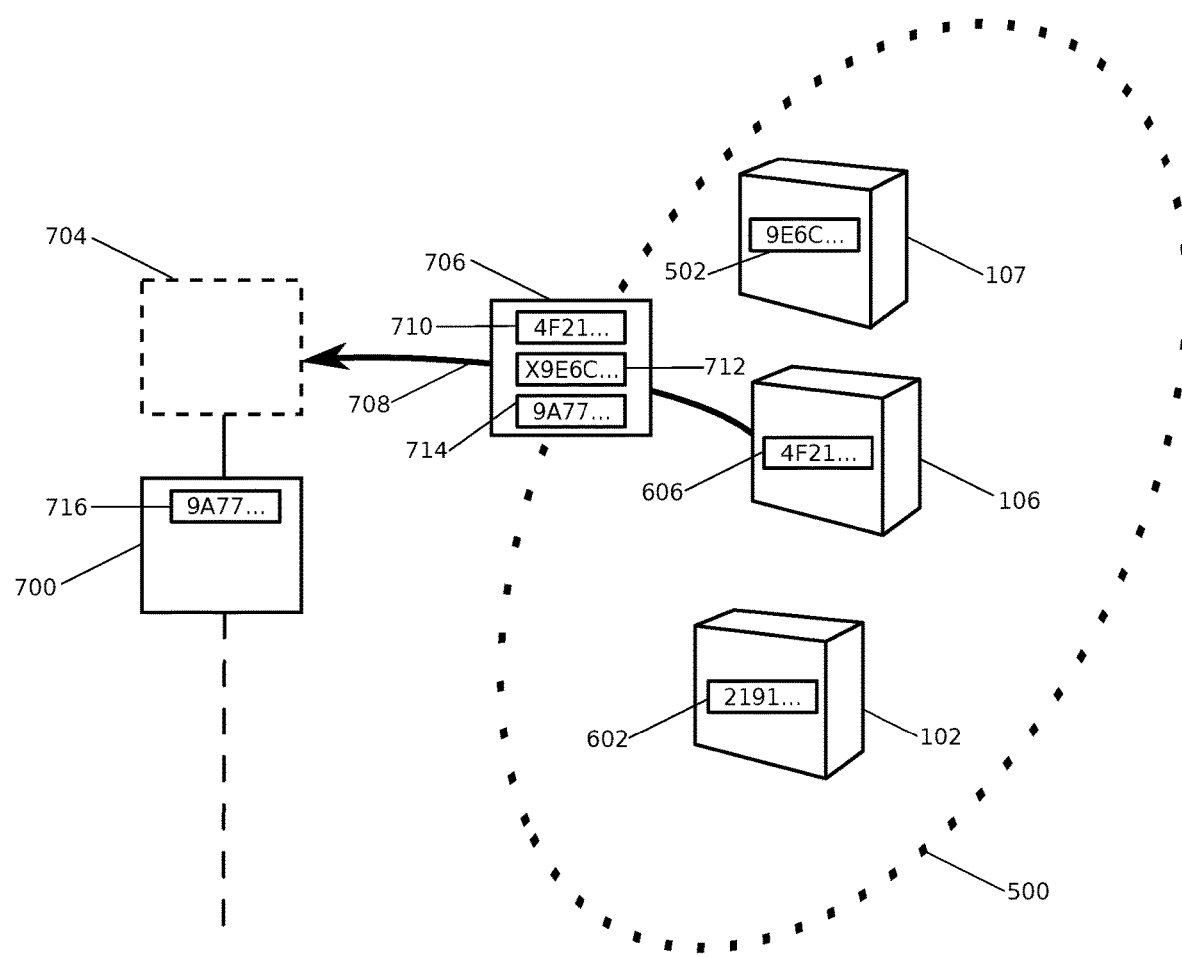
FIG. 7 is a diagram illustrating how the peer-to-peer network and validator nodes act when a primary candidate for submitting a block fails to do so, a secondary candidate submits the block instead, and a revocation of the miner announcement message of the prime candidate that fails to submit the next block of data within an appropriate time.

In an example presented in FIG. 7, in accordance with one embodiment of the invention, the prime candidate for submitting the next block 704 is the validator node 107. This is because the MIN 502 of validator node 107 starts with hexadecimal digits 9E6C, and a hash 716 of a head block 700 starts with hexadecimal digits 9A77, making the MIN 502 of the validator node 107 the closest value. However, in this example the validator node 107 has failed to submit the next block.

As a result, in the example, the secondary candidate may submit a proposed block 706 for the next block 704. As validator node 106 has a next closest MIN 606 starting with hexadecimal digits 4F21, it is the secondary candidate. Validator node 106 may construct the proposed block containing a last hash value 714 that provides a link back to the head block, and a header hash value 710 of a data contained in the proposed block 712.

A submission of the proposed block 712 is indicated by an arrow 708.

In a further embodiment of the invention, the validator node 107 may include a cancellation message 712, whereby a right of the prime candidate, validator node 107, to participate in submission of data blocks may be revoked. Under this embodiment, validator node 107 may be required to resubmit a miner announcement message and wait a predetermined time or number of blocks before it may once again participate in submitting further blocks of data to the distributed ledger.

In this example, the validator node 102 may not submit the next block, as the MIN 602 of the validator node 102, starting as it does with hexadecimal digits 2191, is too far from the hash 716 of the head block 700.

As will be appreciated from the above discussion, an advantage of the systems and methods of this disclosure includes reaching a consensus among peers participating in the maintenance and extension of a distributed ledger, a file, a blockchain or a shared peer-to-peer database in a deterministic and objective manner, without a need for dedicated hardware, significant memory or disk storage space, or computationally and energy intensive calculations.

What is claimed is:

1. A method for reaching a consensus for adding a block of data to a distributed ledger distributed through a peer-to-peer network comprising:

generating an announcement message comprising a public key of a public/private key pair, a unique address identifier, and a hash of the public key and the unique address identifier;

transmitting the announcement message to the peer-to-peer network;

inserting the announcement message into an initial block of data and appending the initial block of data to the distributed ledger;

submitting, at a later time, the block of data, comprising other data and the hash of the public key and the unique address identifier, for inclusion in the distributed ledger;

calculating a hash output from previous data in the distributed ledger;

calculating a difference between the hash output and the hash of the public key and the unique address identifier; and appending the block of data to the distributed ledger when a predetermined condition, calculated using the difference, is met, wherein the predetermined condition comprises the difference matching a value calculated using a function taking as its input the hash output and the hash of the public key and the unique address identifier.

2. The method of claim 1, further comprising waiting a predetermined time before appending the block of data to the distributed ledger.

3. The method of claim 1, further comprising waiting for a predetermined number of blocks to be appended to the distributed ledger before appending the block of data to the distributed ledger.

4. The method of claim 1, wherein the announcement message is signed using a private key of the public/private key pair.

5. The method of claim 1, wherein the hash output is calculated from the previous data using one or more of: a root of a Merkle tree, a root of a Patricia tree, a root of a radix tree, and a set of prior ledger data.

6. The method of claim 1, further comprising: canceling the announcement message when the block of data is not submitted for inclusion in the distributed ledger and the predetermined condition is met.

7. The method of claim 1, wherein the unique address identifier is one or more of: a network address, an email address, a MAC address, a domain name, a passport number, a social security number, a bank account number, a credit card number, and an identification number.

8. The method of claim 1, wherein the function comprises one or more of: a smallest value, a largest value, a value closest to a target value, and a value closest to the target value modulo a constant.

9. A plurality of network connected devices, each comprising: one or more processors, and storage media comprising computer instructions, said plurality of network connected devices being connectible via a peer-to peer network to each other, arranged such that when computer instructions are executed on the one or more processors of one or more of the plurality of network connected devices, operations are caused for reaching a consensus for adding a block of data to a distributed ledger, comprising:
generating, by a first of the plurality of network connected devices, an announcement message comprising a public key of a public/private key pair, a unique address identifier, and a hash of the public key and the unique address identifier;
transmitting the announcement message, by the first of the plurality of network connected devices, through the use of the peer-to-peer network, to the plurality of network connected devices connected to the peer-to-peer network;
inserting the announcement message into an initial block of data by a second of the plurality of network connected devices;
appending the initial block of data to the distributed ledger by the plurality of network connected devices;
submitting, by the first of the plurality of network connected devices, a block of data for inclusion in the distributed ledger;
calculating, by the plurality of network connected devices, a hash output from previous data in the distributed ledger;
calculating, by the plurality of network connected devices, a difference between the hash output and the hash of the public key and the unique address identifier; and
appending, by the plurality of network connected devices, the block of data to the distributed ledger when a predetermined condition, calculated by the plurality of network connected devices using the difference, is met, wherein the predetermined condition comprises the difference matching a value calculated using a function taking as its input the hash output and the hash of the Public key and the unique address identifier.

10. The plurality of network connected devices of claim 9, further comprising the first of the plurality of network connected devices waiting a predetermined time before submitting the block of data.

11. The plurality of network connected devices of claim 9, further comprising the first of the plurality of network connected devices waiting for a predetermined number of blocks to be appended to the distributed ledger before submitting the block of data.

12. The plurality of network connected devices of claim 9, wherein the announcement message is signed by the first of the plurality of network connected devices using a private key of the public/private key pair.

13. The plurality of network connected devices of claim 9, wherein the hash output is calculated by the plurality of network connected devices from the previous data using one or more of: a root of a Merkle tree, a root of a Patricia tree, a root of a radix tree, and a set of prior ledger data.

14. The plurality of network connected devices of claim 9, wherein when the first of the network connected devices for which the predetermined condition is met, does not submit the block of data for inclusion in the distributed ledger, then the announcement message for the second of the network connected devices is canceled.

15. The plurality of network connected devices of claim 9, wherein the unique address identifier is one or more of: a network address, an email address, a MAC address, a domain name, a passport number, a social security number, a bank account number, a credit card number, and an identification number.

16. The plurality of network connected devices of claim 9, wherein the function comprises: a smallest value, a largest value, a value closest to a target value, and a value closest to the target value modulo a constant.

* * * * *